United States Patent [19]

Stewart, Jr.

[11] Patent Number: 4,787,653

[45] Date of Patent: Nov. 29, 1988

[54] NON-BUCKLING NEWSPAPER AND DEVICE FOR THE PRODUCTION THEREOF

[76] Inventor: Robert B. Stewart, Jr., 7813 Widdecomb Rd., Powell, Tenn. 37849

[21] Appl. No.: 65,009

[22] Filed: Jun. 22, 1987

[51] Int. Cl.[4] .......................... B42D 1/00; B42D 9/00; G09B 29/00; B31B 1/25

[52] U.S. Cl. .......................................... 281/2; 281/42; 283/34; 493/404

[58] Field of Search ................. 281/1, 2, 42; 282/1 A, 282/3 R, 3 B; 283/34; 30/314, 315, 362, DIG. 3, DIG. 8; 493/59, 186, 396, 399, 404, 405; 270/32, 40, 41

[56] References Cited

U.S. PATENT DOCUMENTS

| | | | |
|---|---|---|---|
| 1,388,931 | 8/1921 | Celler | 30/315 |
| 1,529,683 | 3/1925 | Anderson | 30/315 |
| 2,572,460 | 10/1951 | Falk | 281/2 |
| 2,615,732 | 10/1952 | Falk | 283/34 |
| 3,248,806 | 5/1966 | Schrader | 283/34 |
| 4,618,166 | 10/1986 | Hsi | 281/42 |

FOREIGN PATENT DOCUMENTS

| | | | |
|---|---|---|---|
| 212445 | 3/1924 | United Kingdom | 283/34 |

*Primary Examiner*—E. R. Kazenske

*Assistant Examiner*—Paul M. Heyrana, Sr

*Attorney, Agent, or Firm*—Norman B. Rainer

[57] ABSTRACT

A slit is cut along the nesting fold line of a doubly folded folio format newspaper in order to minimize the buckling of the paper when the pages are turned. The slit has a length of between about 2 and 5 inches and is located so as to be bisected by the secondary fold line of the newspaper which is perpendicularly disposed to the nesting fold line. A specialized tool is provided for manually cutting the slit.

3 Claims, 1 Drawing Sheet

NON-BUCKLING NEWSPAPER AND DEVICE FOR THE PRODUCTION THEREOF

BACKGROUND OF THE INVENTION

This invention relates to an improvement in doubly folded newspapers, whereby the pages may be turned without buckling of the paper.

There are generally two styles of newspaper formats in present use. One style is the tabloid format comprised of a number of singly folded and nested sheets of paper presenting a page size of about 12"×15". The other style is the folio format having a page size of about 15"×23" and wherein, in addition to a center or nesting fold line, the newspaper is further folded along a horizontally bisecting fold line.

The tabloid style presents no problems in the turning of pages during reading since the pages easily pivot at the nested fold line. However, the turning of pages in the folio format paper is difficult because, when the newpaper is opened, the two exposed pages have oppositely directed horizontal folds which meet at the center or nested fold line. Unless the newspaper is held perfectly flat, buckling will occur upon turning as the upwardly directed horizontal fold of the right hand page inverts to a downwardly directed fold. The condition is accentuated if a second page is turned upon an already buckled previous page. This problem causes some annoyance to the reader, who has to straighten out the buckled portions to permit turning of the pages.

It is accordingly an object of the present invention to modify a doubly folded folio format newspaper so that the pages may be more easily turned.

It is a further object of the invention to provide a device for achieving the modifications of the foregoing object.

These objects and other objects and advantages of the invention will be apparent from the following description.

SUMMARY OF THE INVENTION

The above and other beneficial objects and advantages are accomplished in accordance with the present invention by a modification in a doubly folded folio format newspaper having a nesting fold line and a secondary fold line which perpendicularly bisects said nesting fold line, said modification comprising a slit of about 2 to 5 inches length penetrating all the pages of the newspaper along the nested fold line in substantially symmetrical disposition about said secondary fold line. In an alternative embodiment, a second slit may be formed in perpendicular disposition to the slit along the nested fold line.

In another aspect of this invention, a cutting tool is provided for use by the reader in manually cutting the aforesaid slit in proper alignment with the nested fold line and secondary fold line.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing:

FIG. 3 is a perspective view of a manually operable cutting tool useful in achieving the newspaper modifications of this invention.

FIG. 4 is an end view of the tool of FIG. 3.

FIG. 5 is a bottom view of the tool of FIG. 3.

DESCRIPTION OF THE PREFERRED EMBODIMENT

Figure 2:
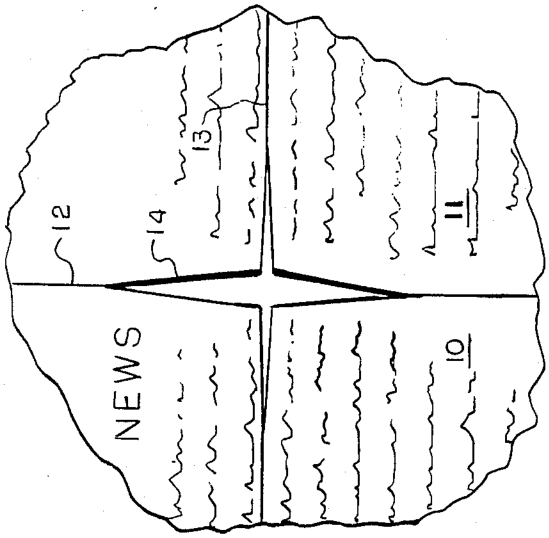
FIG. 2 is an enlarged fragmentary perspective view of the newspaper.
Figure 1:
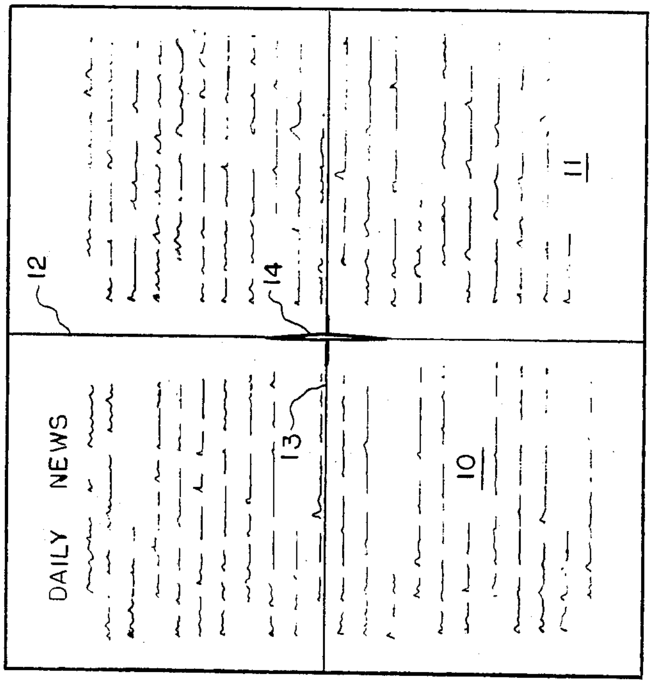
FIG. 1 is a top plan view of a folio format newspaper in an opened state showing the slit along the nested fold line.

Referring to FIG. 1, an improved folio style newspaper is shown in its open state and comprises of left hand page 10, right hand page 11, nested fold line 12 and secondary fold line 13. A slit 14 has been cut through the pages of the newspaper along nested fold line 12. The length of the slit will range between about 2 and 5 inches and is located so as to be bisected by secondary fold line 13.

The slit may be cut into the newspaper by the newspaper printing company using a properly oriented automatic cutting device. Alternatively, the purchaser of the newspaper can manually cut the aforesaid slit. For such purpose, the cutting tool of FIGS. 3-5 is provided. Said tool is comprised of holding base 15 having a handle 16 mounted upon upper surface 18 of said holding base, and an elongated cutting blade 17 perpendicularly pendant from lower surface 19. In other modifications, a short cross-mounted blade may be associated with blade 17 to provide short slits along the secondary fold line of the newspaper.

By virtue of slit 14 and its particular placement, the pages of the folio format newspaper can be easily turned without buckling of the pages. The slit is preferably merely a cut in the paper, but in equivalent alternative embodiments the slit may be an elongated narrow rectangular aperture defining a region where paper has been cut and removed. The slit may also be discontinuous, being comprised of an aligned series of short slits.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. In a doubly folded folio format newspaper having a nesting fold line and a secondard fold line which perpendicularly bisects said nesting fold line, the improvement comprising a slit of between about 2 and 5 inches length penetrating all the pages of the newspaper along the nested fold line perpendicular to and substantially symmetrical about said secondary fold line, whereby the turning of the pages is simplified because of a diminished occurrence of buckling of the pages adjacent said slit.

2. The improved newspaper of claim 1 wherein a second slit is formed penetrating all the pages of the newspaper along the said secondary fold line in perpendicular disposition to the slit along the nested fold line.

3. The improved newspaper of claim 1, said slit comprising a cut involving no removal of paper.

* * * * *